(12) United States Patent
Robey et al.

(10) Patent No.: US 6,540,888 B2
(45) Date of Patent: Apr. 1, 2003

(54) MINERAL IONIZING DEVICE

(75) Inventors: Marvin Robey, 13133 Joshua Ave., Chino, CA (US) 91710; Ralph Kuttner, Fullerton, CA (US)

(73) Assignee: Marvin Robey, Chino, CA (US)

( * ) Notice: Subject to any disclaimer, the term of this patent is extended or adjusted under 35 U.S.C. 154(b) by 0 days.

(21) Appl. No.: 09/810,715

(22) Filed: Mar. 19, 2001

(65) Prior Publication Data

US 2002/0157962 A1 Oct. 31, 2002

Related U.S. Application Data (60) Provisional application No. 60/248,070, filed on Nov. 14, 2000.

(51) Int. Cl.[7] .............................. C25B 9/04; C25B 9/00
(52) U.S. Cl. ................................ 204/275.1; 204/230.2; 204/272; 204/273; 204/229.7
(58) Field of Search ............................. 204/242, 275.1, 204/272, 278, 222, 230.2, 289, 229.7, 273; 205/742, 760

(56) References Cited

U.S. PATENT DOCUMENTS

| | | | | |
|---|---|---|---|---|
| 4,337,136 A | * | 6/1982 | Dahlgren | .................... 204/242 |
| 4,935,116 A | * | 6/1990 | LeMire | ........................ 204/237 |
| 5,364,512 A | * | 11/1994 | Earl | ........................ 204/229.6 |
| 5,753,100 A | * | 5/1998 | Lumsden | .................... 204/272 |

* cited by examiner

*Primary Examiner*—Nam Nguyen
*Assistant Examiner*—Thomas H. Parsons
(74) *Attorney, Agent, or Firm*—Albert O. Cota (57) ABSTRACT

A mineral ionizing device (10) consisting of a container (20) filled with water and containing a solid-mineral, cylindrical first electrode (50), a second electrode (58) coaxially located within the first electrode (50), a vibration unit (100) which produces a vibration within the container (20), a set of protrusions (64) located on the surface of the second electrode (58) and a periodic current reversing unit (84) which applies a d-c current across the first and second electrodes (50,58). The combination of the vibration unit (100), the protrusions (64) and the current reversing unit (84) aids in releasing gaseous bubbles which form on the surface of the second electrode (58). The application of the d-c current causes the mineral in the first electrode (50) to release mineral ions into the water which results in the production of very clean mineral water.

5 Claims, 5 Drawing Sheets

MINERAL IONIZING DEVICE

This application claims the benefit of Provisional application Ser. No. 60/248,070, filed Nov. 14, 2000.

TECHNICAL FIELD

The invention generally pertains to ionization devices, and more particularly to a mineral ionizing device which allows a solid mineral, such as silver, to be ionized into water to produce mineral water.

BACKGROUND ART

Certain mineral springs and water have long been reputed to improve health in many ways. Metal minerals have been believed to produce health and emotional stability when properly used. Silver, for example, can be ground fine and used internally and externally to kill infection and cure many diseases. A chemical process of producing silver in water, which is called "colloidal silver" is utilized for the prevention and cure of many diseases.

Around 1900 a process was developed which produced ionized silver in water by applying a high voltage are between two silver electrodes under water. This produced silver in ionized form which at the atomic level Ag+1, is a much more effective form of silver for the treatment of various diseases.

Ionized silver proved to be safe and non-toxic, even in extremely high amounts. This form of silver has subsequently been clinically tested on over 700 different pathogens, including bacteria, virile, fungus and larvae. Only a handful of pathogens have been shown to be unaffected by ionized silver.

Inorganic, non-ionized minerals are absorbed by plants, and once absorbed by plants, take on an ionized form in a chemical solution, and in general, organic nutrients are in ionized form. Minerals not ionized tend to be poorly absorbed in humans and animals and often form dangerous deposits, causing such conditions as arthritis, rheumatism and bone spurs. Most minerals in ionized form are not dangerous, even in very large quantities, including some which are very dangerous in other forms.

A device and process has been developed for producing Ag+1 by passing a direct current across a first electrode (anode) and a second electrode (cathode). This process is also effective for the production of other mineral waters, such as zinc, copper, magnesium, gold, platinum and other electrically-conductive minerals.

In view of conventional mineral ionizers, there is a need for a mineral ionizing device in which the first electrode can be easily removed for cleaning, replacing and changing from one type of solid mineral to another, while maintaining the spacing between the first electrode and the second electrode. There is also a need for reliable, maintenance-free equipment which operates with a minimum of gases collecting on the second electrode, which allows a higher quality mineral water to be produced. There is also a need for a mineral ionizing device which can be operated with distilled water so that mineral water of maximum purity, especially useful for intravenous injection, can be produced.

A search of the prior art did not disclose any patents that read directly to the claims of the instant invention however, the following patents covering colloidal silver are considered related:

| U.S. Pat. No. | INVENTOR | ISSUED |
| --- | --- | --- |
| 4,755,268 | Matsuo | 5 Jul. 1998 |
| 3,655,412 | Kumai et al | 11 Apr. 1972 |

The U.S. Pat. No. 4,755,268 discloses a process for producing silver-ionic water, comprising; a step of passing water through a first electrolytic cell chamber containing an anode and a cathode and provided with silver on the anode, under the application of a voltage, to dissolve out silver ions; and a step of passing the water in which the silver ions have been dissolved out, through either one or both of an anode compartment and a cathode compartment of a second electrolytic cell chamber containing an anode and a cathode and separated into the anode compartment and the cathode compartment with a diaphragm formed between both of the electrodes. The process is useful for producing acidic silver-ionic water and/or alkaline silver-ionic water without causing the formation of colloids.

The U.S. Pat. No. 3,655,412 discloses dispersions of colloidal silver having a neutral black or slightly bluish-black color. The process for forming the above described dispersions in gelatin comprises mixing an aqueous alkaline gelatin solution with an aqueous solution of a water-soluble silver salt and from 0.005 solution of a water-soluble silver salt and from 0.005 to 0.7 moles of a water-soluble manganous salt per mole of the silver salt, and then reducing the silver salt by adding at least 0.2 moles per mole of the silver salt of an alkali metal sulphite and an excess of a water-soluble silver salt reducing agent.

DISCLOSURE OF THE INVENTION

The mineral ionizing device is designed to produce mineral water by ionizing in water, a solid mineral such as silver. In its most basic design, the mineral ionizing device consists of:

A container designed to contain a specific quantity of water or to allow the passage of a continuous flow of water. In the continuous water flow design the container has attached a water inlet tube connected to a water source and a water outlet tube connected to a water reservoir.

A solid-mineral first electrode located within the container.

A second electrode located within the container, and,

Means for applying a positive d-c current to the first electrode and a negative d-c current to the second electrode. The applied current causes the first electrode to ionize and release particles of ionized minerals into the water to produce mineral water. The highest purity mineral water is produced when distilled water is used.

The solid mineral used for the first electrode is commonly silver however, other solid minerals such as chromium, copper, gold, iridium, platinum, manganese, zinc and the like can also be used. The first electrode preferably consists of a cylindrical structure into which is coaxially located the second electrode.

The means for applying the electrical current can consist of a d-c power source or a rectified utility power source and may incorporate a periodic current-reversing circuit. The periodic reversing of the applied current flow, which occurs at approximately 10 percent of the time, aids in releasing gaseous bubbles that typically form on the surface of the second electrode. The formation of the bubbles occurs because the ionization process is electrolytic which produces oxygen and hydrogen gases. These bubbles cause oxidation of some minerals and a degraded quality product. To reduce the gaseous bubbles to a minimum the following four bubble reducing means are utilized in the inventive device:

1. A high ratio of area between the first and second electrodes, whereby the second electrode has a minimum area to hold the bubbles,
2. Protrusions on the second electrode whereby the bubbles form only on the tips of the protrusions further reducing the area of the second electrode holding the bubbles an also making them easier to release,
3. A vibration to dislodge the bubbles and,
4. A current reversal to release the bubbles.

In view of the above disclosure, it is the primary object of the invention to provide a mineral ionizing device for the efficient production of ionized mineral water of consistently high purity. In addition to the primary object, it is also an object of the invention to provide a mineral ionizing device that:

allows the electrodes to be quickly and easily removed for cleaning, replacing and changing from one type of mineral to another, while maintaining the spacing between the first and second electrodes, operates with a minimum of gaseous bubbles collecting on the second electrode which allows a higher quality of mineral water to be produced, that can be used with distilled water to produce mineral water of maximum purity, provides a high ratio of surface area between the first and second electrodes, while allowing the water to flow freely between the two electrodes, provides a consistent electrical field between the first and second electrodes, is reliable and maintenance free, and is cost effective from both manufacturing and consumer points of view.

These and other objects and advantages of the present invention will become apparent form the subsequent detailed description of the preferred embodiment and the appended claims taken in conjunction with the accompanying drawings.

DETAILED DESCRIPTION OF THE INVENTION

The best mode for carrying out the invention is presented in terms of a preferred embodiment for a mineral ionizing device 10 which allows a solid mineral to be ionized into water to produce mineral water. The use of distilled water produces mineral water 110 of the highest purity. Additionally the device 10 utilizes a solid-mineral first electrode 50 and a second electrode 58. The first electrode 50 preferably has a cylindrical shape into which is coaxially located the second electrode 58. The first electrode can be made of various minerals including: silver, chromium, copper, gold, iridium, platinum, manganese, zinc and the like.

Figure 1:
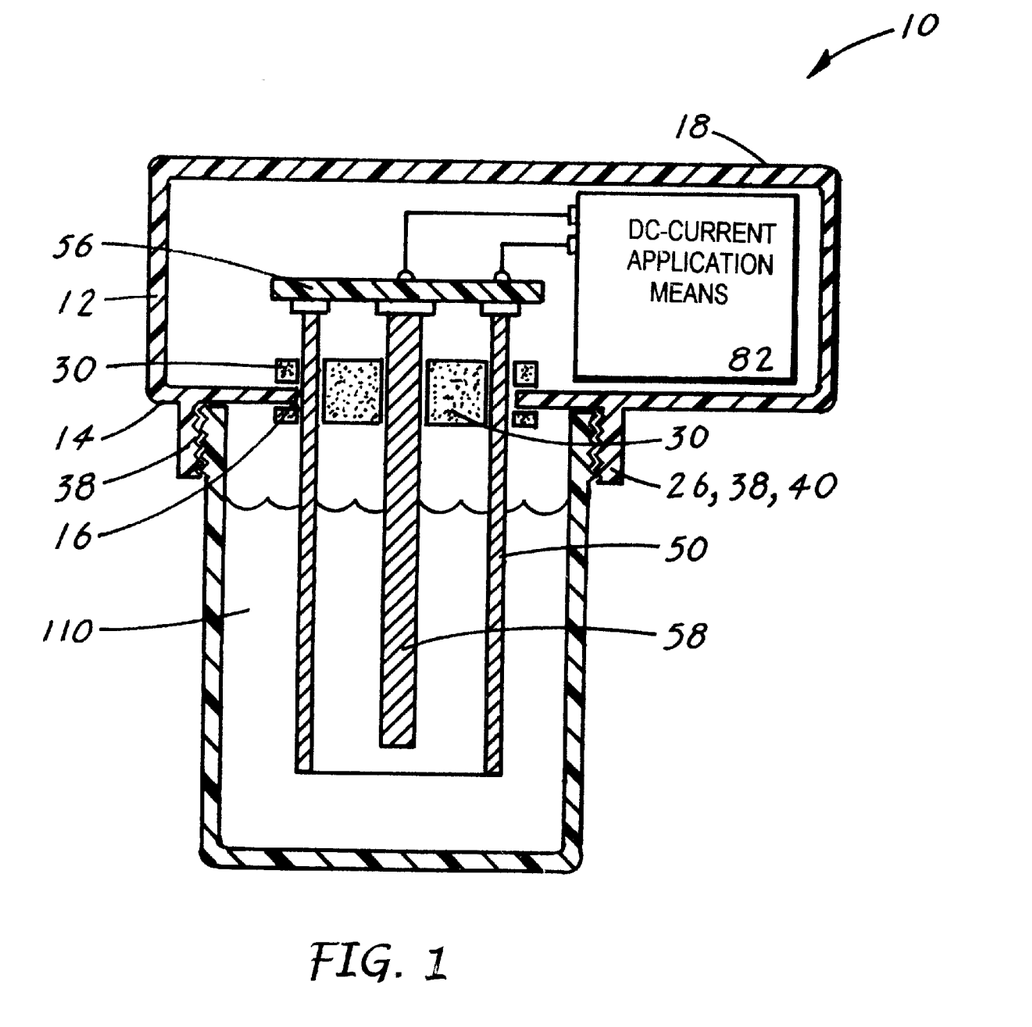
FIG. 1 is a cross-sectional, elevational view of a basic design for a mineral ionization device.
Figure 2:
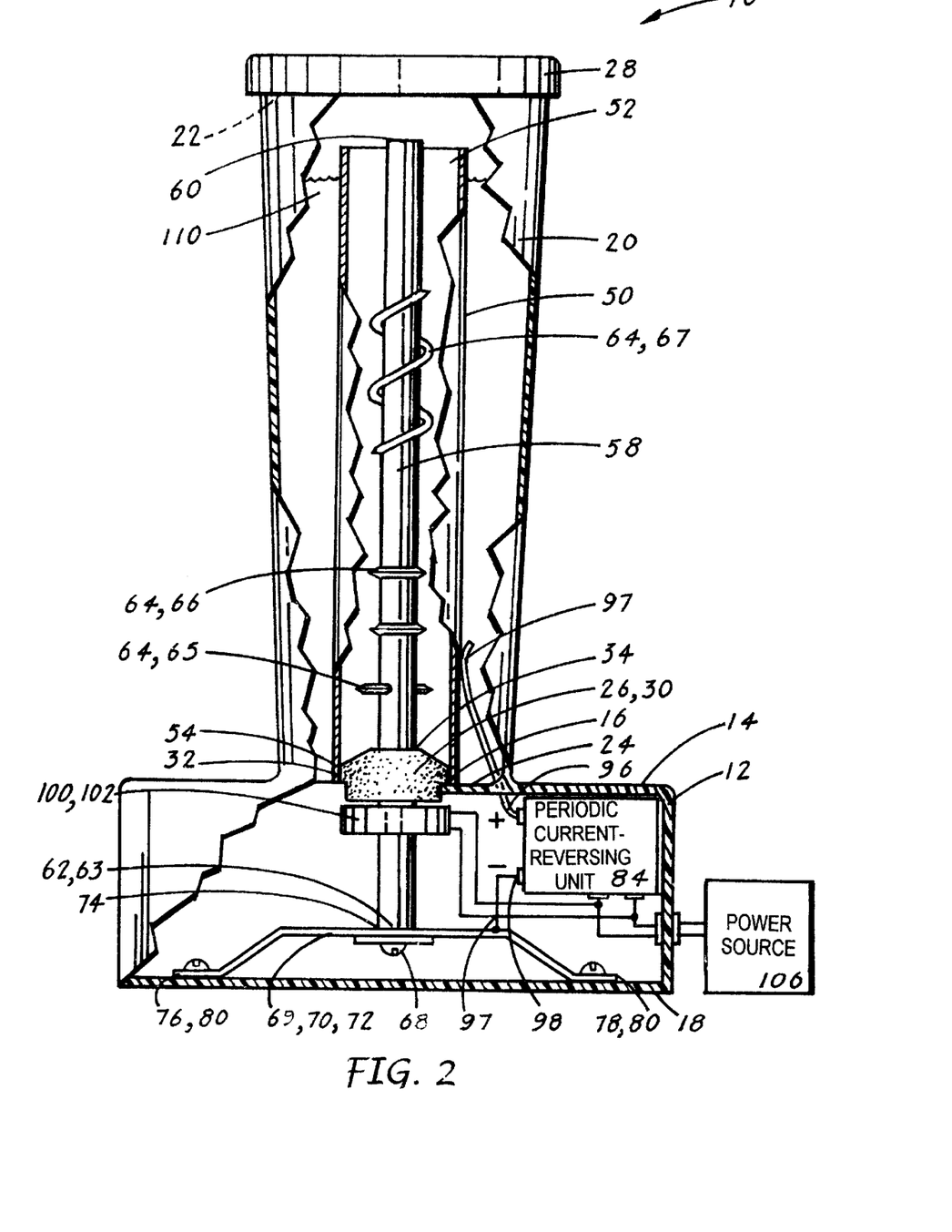
FIG. 2 is a cross-sectional, elevational view of an enhanced design for a mineral ionizing device that produces a fixed quantity of mineral water.
Figure 3:
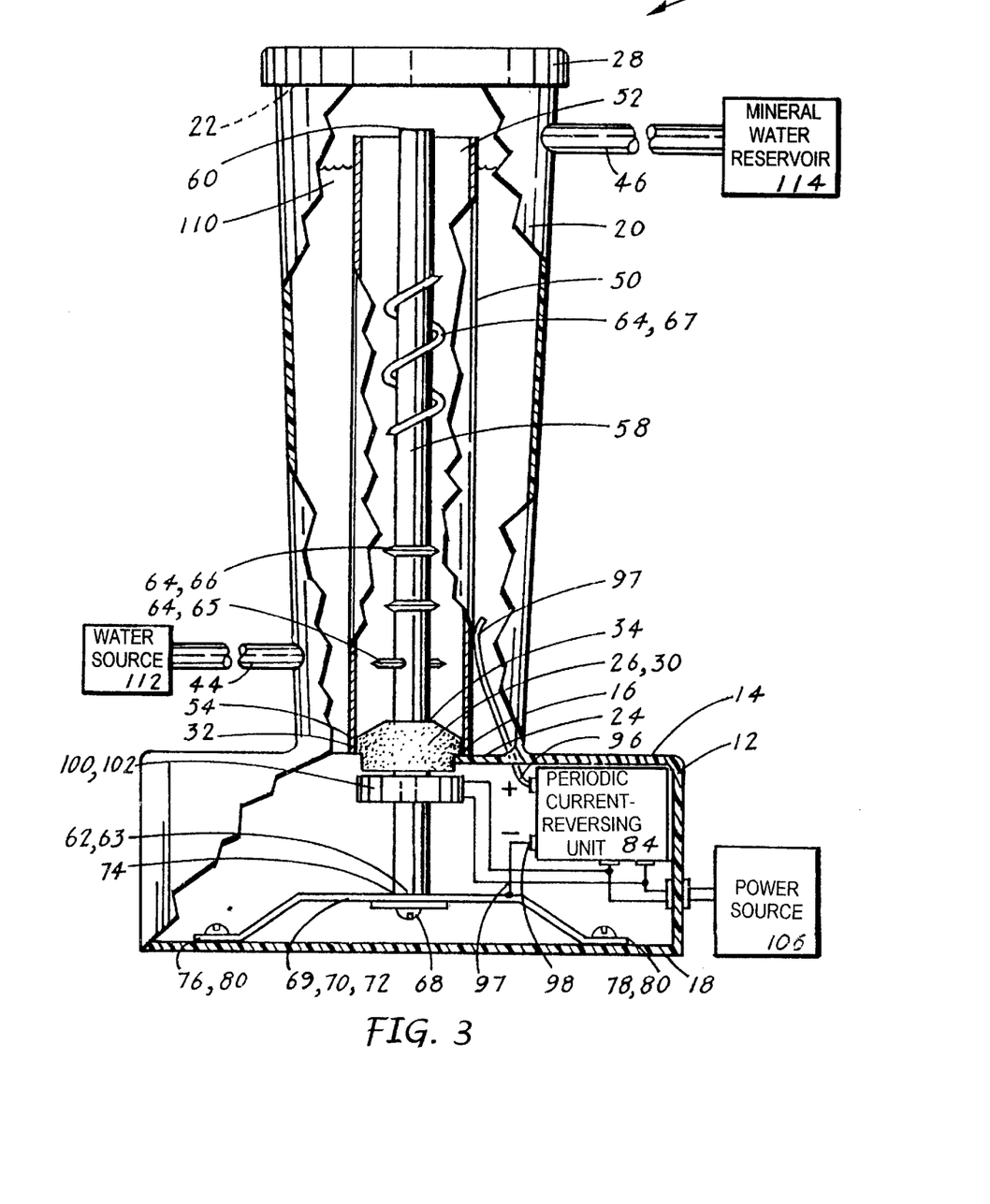
FIG. 3 is a cross-sectional, elevational view of the mineral ionizing device shown in FIG. 2 which incorporates a water inlet tube and a water outlet tube. The two tubes allow the device to provide a continuous flow of mineral water.
Figure 4A:
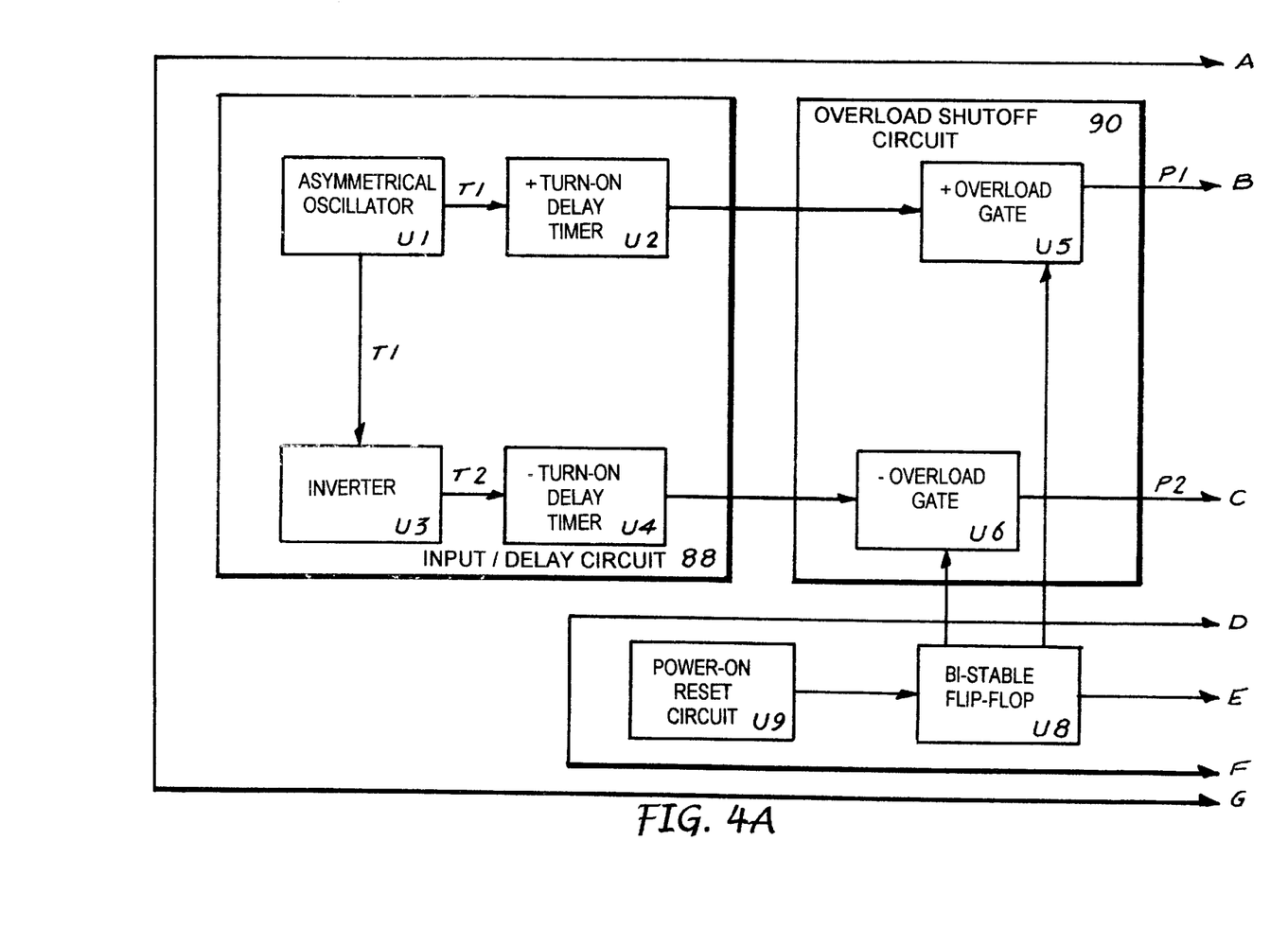
FIGS. 4A and 4B are block diagrams of a typical periodic current-reversing unit.
Figure 4B:
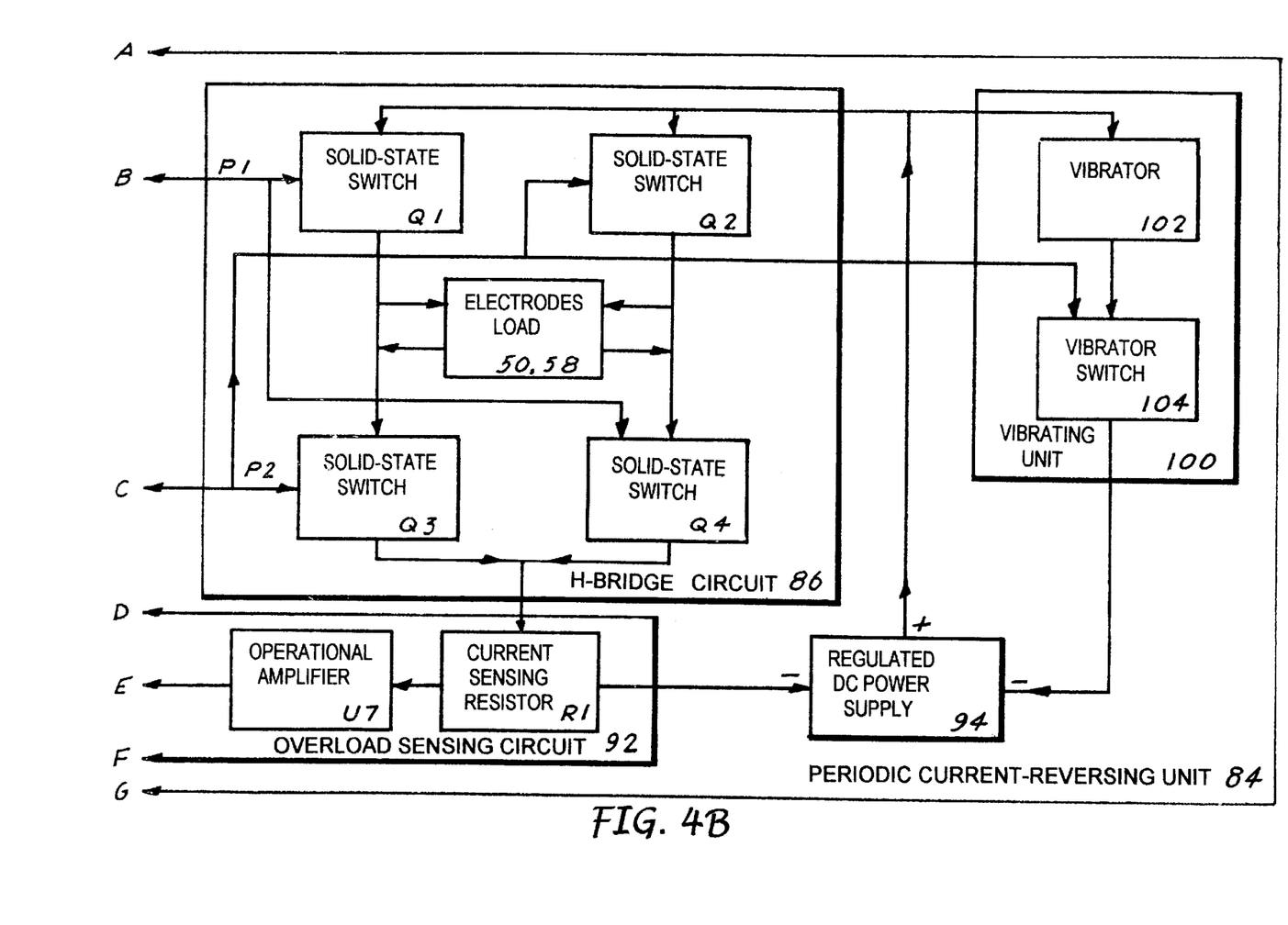

The preferred embodiment is shown in FIGS. 2–4B. The basic design of the device 10 is shown in FIG. 1. An enhanced design for the device 10 which produces a specified quantity of mineral water 110 is shown in FIG. 2; an enhanced design which produces a continuous flow of mineral water is shown in FIG. 3, and in FIGS. 4A and 4B is shown a block diagram of a periodic current-reversing unit 84 which supplies electrical d-c current to control the operation of the device 10 and which includes a current reversing circuit. Under normal operation, the unit 84 applies a +d-c current to the first electrode (anode) and a −d-c current to the second electrode (cathode). This d-c current application changes only when the unit 84 reverses the polarity of the d-c current which occurs typically during approximately a ten percent duty cycle. Additionally, the power is normally applied at 24-volts d-c, however, a higher or lower voltage may also be used.

The basic design of the mineral ionizing device 10, as shown in FIG. 1, is comprised of the following major elements: an enclosure 12, a solid-mineral, cylindrical first electrode 50, a second electrode 58, an elongated container 20 and a periodic current reversing unit 84.

The enclosure 12 includes a first horizontal surface 14 and a second horizontal surface 18. The device 10 can be mounted, as shown in FIG. 1, with the rear vertical surface of the enclosure 12 mounted to a vertical wall with the elongated container 20 facing downward; or the second horizontal surface 18 enclosure can be placed on a substantially horizontal surface with the elongated container 20 facing upward as shown in FIGS. 2 and 3. Releasably attached to the first horizontal surface 18 are the solid-mineral cylindrical first electrode 50 and the second electrode 58.

Several structures can be utilized for mounting the electrodes 50,58 to the enclosure 12—one such structure is shown in FIG. 1. Also, the d-c current applied across the two electrodes can be from a power source that is located within the enclosure 12, as shown in FIG. 1, or external to the enclosure (not shown). The first electrode 50 has a first end 52 and a second end 54. As shown in FIG. 1, the second end 54 penetrates through the first horizontal surface 14 of the enclosure 12. The second electrode 58, which is configured as a rod or a tube, is coaxially located within the cylindrical first electrode, and has a first end 60 and a second end 62. Likewise, the second end 62 penetrates through the first horizontal surface 14 of the first horizontal surface 14.

The two electrodes are maintained within the enclosure 12 by a sealing structure such as a resilient seal 30 that is inserted into a seal bore 16 located on the first horizontal surface 14 of the enclosure 12. The penetrating first ends 52,60 of the respective first and second electrodes 50,58 terminate at a dual-contact, electrical terminal board 56 as shown in FIG. 1.

The elongated container 20 is dimensioned to enclose the first and second electrodes 50,58 and is attached, by an attachment means 26, to the first horizontal surface 14 of the enclosure 12. A typical attachment means 26, as shown in FIG. 1, consists of a threaded sleeve 38 into which is threaded a container 20 which include a set of corresponding threads 40. In operation the container 20 is filled with a quantity of water which surrounds the two electrodes 50,58.

Located within the enclosure 12 is located a means 82 for applying a d-c current across the first and second electrodes 50,58. The applied current causes the liquid emersed first electrode 50 to ionize and release particles of ionized material into the water to produce the mineral water.

The first enhanced design of the mineral ionizing device 10, as shown in FIG. 2, is comprised of the following major elements; an enclosure 12, an elongated container 20, a solid-mineral, cylindrical first electrode 50, a second electrode 58, a current applying means 82 prferably consisting of a set of protrusions 64, a periodic current-reversing unit 84 and a vibrating unit 100.

The enclosure 12 includes a first horizontal surface 14 and a second horizontal surface 18. The first horizontal surface 14 has therethrough a seal bore 16 into which is securely inserted a resilient seal 30 having a perimeter 31 and a central bore 34. To the first horizontal surface is also attached the solid-mineral, cylindrical first electrode 50, the second electrode 58 and the elongated container 20. Within the enclosure 12, as shown in FIG. 2, is located a vibratory spring 69 which preferably is designed to be in resonance with the frequency of the vibrating unit 100. The spring 69 has an inverted V-shape 70 with a central horizontal section 72 having therethrough a centered bore 74, and a first end 76 and a second end 78. The two ends 76,78 are attached, by an attachment means 80, to the interior of the second horizontal surface 18 of the enclosure 12.

The first electrode 50, has an upper end 52 and a lower end 54. The lower end 54 is securely held around the perimeter 32 of the resilient seal 30. The second electrode 58 is coaxially located within the first electrode and has an upper end 60 that is adjacent to the upper end 52 of the first electrode 50. The lower end 62, which includes a set of threads 63, is inserted through the central bore 34 on the resilient seal 30 and is attached by a bolt 68 inserted through the centered bore 74 on the vibratory spring 69 and into the threaded lower end 62,63 of the second electrode 58. As shown in FIGS. 2 and 3, the second electrode 58 can be produced to include a set of protrusions 64, as shown in FIGS. 2 and 3. These protrusions can consist of individual spikes 65 or rings 66 that are dispersed along the length of the second electrode 58, or a single strand 67 that is spiraled along the length of the second electrode 58. The protrusions 64 are designed to attract gaseous bubbles which can form on the surface of the second electrode 58. The protrusions, in combination with the current reversing unit 84 and the vibrating unit 100, aid in releasing the bubbles which are detrimental to producing a clean mineral water.

The elongated container 20 has an open upper end 22 and a lower end 24. The container 20 is dimensioned to enclose the first and second electrodes 50,58 an is attached, by an attachment means 26, to the first horizontal surface 14 of the enclosure 12 with the lower end 24 overlapping the resilient seal. The container attachment means 26 can consist of an enclosure 12 with a first horizontal surface 14 having a threaded sleeve 38, as shown in FIG. 1, which receives a container 20 having a set of mating threads 40. Alternatively, as shown in FIGS. 2 and 3, the container 20 can be made integral with the upper surface 14 of the enclosure 12. In this second design, the open upper end 22 of the container 20 is covered with a lid 28.

The periodic current-reversing unit 84, can be located external to the enclosure 12 (not shown) or can be located within the enclosure 12, as shown IN FIGS. 2 and 3. The unit 84 is designed to produce a polarity-reversing d-c current output. The first side 96 of the d-c output current is connected to the first electrode 50 via an electrical lead 97; the second side 98 of the d-c output current is connected to the second electrode 58 via a lead 97 and the vibratory spring 68. The unit 84 can be produced in several designs, one such design follows.

The periodic current reversing unit 84 as shown in the block diagram of FIG. 4, is comprised of the following major elements: an H-bridge circuit 86, an input/delay circuit 88, an overload shut-off circuit 90, an overload sensing circuit 92, and a regulated d-c power supply 94 that is operated by an a-c utility power source and typically has an output of 24 volts d-c. The core of the periodic current reversing unit 84 is the H-bridge circuit 86 which has an output connected across the first electrode 50 and the second electrode 58. The circuit 85 is comprised of four solid-state switches Q1,Q2,Q3 and Q4 that preferably consist of MOS-FET devices. The circuit 86 allows current, in a first time period, to flow in a forward direction and in a second time period, to flow in a reverse direction.

To allow current to flow in the forward direction, the MOSFET's Q1 and Q4 are enabled, while keeping the MOSFET's Q2 and Q3 disabled. This condition causes current supplied by the 24-volt d-c power supply 94 to flow sequentially through the MOSFET Q1, the first and second electrodes 50,58, the MOSFET Q4 and back to the power supply 94. Conversely, when the MOSFET's Q2 and Q3 are enabled and the MOSFET's Q1 and Q4 are disabled, the current flow is reversed and flows sequentially through the MOSFET Q2, the first and second electrodes 50,58, MOS-FET Q3 and back to the power supply 94. Thus, the requirement to periodically reverse the current to the two electrodes is accomplished.

The operation of the H-bridge circuit 86 commences with the input/delay circuit 88 which is comprised of an asymmetrical oscillator U1, a +turn-on delay timer U2, and inverter U3, and a −turn-on delay timer U4. The asymmetrical oscillator U1 is configured as an astable square wave oscillator which has an uneven duty cycle, that is, the "ON" time is greater than the "OFF" time. Thus, the circuit 88 sets the timing for the forward current and the reverse current pulse. The output of the oscillator U1 is a signal T1 which is applied directly to the +turn-on delay timer U2 and to the inverter U3 which inverts the signal T1 to an output signal T2 which is then applied to the −turn-on delay circuit U4. The function of U2 and U4 is to ensure that the two sections of the H-bridge circuit 86 are not enabled at the same time. This event would cause a short circuit across the d-c power supply 94 and possibly cause catastrophic damage to the H-bridge circuit 86.

The output signals from U2 and U4 locate din the input/delay circuit 88 are applied respectively to the +overload gate U5 and to a −overload gate U6 which comprise the overload shutoff circuit 90. As shown in FIG. 4A, the output of U5 is a drive signal P1 that is connected to the gates of Q1 and Q4 and the output of U6 is a drive signal P2 that is connected to Q2 and Q3. When the drive signal P1 enables Q1 and Q4, the drive signal P2 disables Q2 and Q3.

The drive signals P1 and P2 are monitored and controlled by the overload sensing circuit 92 which is comprised of: a current sensing resistor R1, an operational amplifier U7, a bistable flip-flop U8 and a power-on reset circuit U9.

If the current through the H-bridge circuit 86 exceeds a threshold level it is sensed by the current sensing resistor R1. The resistor R1 output is amplified by an operational amplifier U7 from where a signal is applied to the bistable flip-flop U8. When power is supplied to the assembly by the power supply 94 the power-on reset circuit U9 is set to the "ON" condition which then enables the flip-flop U8. This event causes the circuits U5 and U6 to turn to their "ON" state which enables the H-bridge circuit 86. In the event of an overload condition the flip-flop U8 is disabled by the output from the operational amplifier U7 which disables the circuits U5 and U6 which, in turn disables the H-bridge 86 and subsequently the periodic current reversing unit 84. The unit 84 can only be turned back "ON" by resetting the flip-flop U8 which is accomplished by turning the power supply 94 "OFF" and then back "ON".

As also shown in FIG. 4B the unit 84 is also used to control the operation of a means for producing a vibration within the container 20. The vibration can be produced by a vibrating unit 100 comprised of a vibrator 102 and a vibrator switch 104. The vibrator 102 is connected to the 24-volt d-c power supply 94 and the vibrator switch 104 is controlled by the drive signal P2 applied from the − overload gate U6 at the same time the signal P2 is applied to the solid state switch Q2 and Q3 located in the H-bridge circuit 86. Thus, the vibrator 102 vibrates the second electrode 58 for a time period equal to the time period when the reverse current is applied to switch Q2 and Q3 of the H-bridge circuit 86.

The vibration unit 100, as described above, operates on 24-volts d-c however, as shown in FIGS. 2 and 3, the vibrating unit 100 can be designed to operate directly from an a-c utility power source 106.

The second enhanced design of the mineral ionizing device 10, as shown in FIG. 3, is identical with the second enhanced design with the exception that the second enhancement includes a water inlet tube 44 connected to a water source 112, and a water outlet tube 46 connected to a water mineral water reservoir 114. This arrangement allows the device 10 to produce a continuous quantity of mineral water 110. OPERATION PROCESS The process for producing mineral water is comprised of the following steps:

a) select a mineral ionizing device 10 designed to produce a specific mineral, b) fill the enclosure 12 with a specific quantity of water, c) activate the periodic current reversing unit 84 for a time period commensurate with the selected mineral and the quantity of mineral water that is to be produced, d) shut the device "OFF" at the completion of the time period, and e) pour the mineral water from the enclosure 12 into an external container.

While the invention has been described in complete detail and pictorially shown in the accompanying drawings it is not to be limited to such details, since many changes and modifications may be made to the invention without departing from the spirit and the scope thereof. For example, various methods for attaching the container 20 to the enclosure 12 can be designed; the power level applied to the two electrodes 50,58 can vary depending on the mineral used to produce the electrodes, and the discrete components used in the design of the periodic current-reversing unit 84 could be combined in an Application Specific Integrated Circuit (ASIC) which would decrease cost and increase the reliability of the unit 10. Hence, it is described to cover any and all modifications and forms which may come within the language and scope of the claims.

What is claimed is:

1. A mineral ionizing device consisting essentially of:

a) a container designed to contain a specific quantity of water or to allow the passage of a continuous flow of water, wherein said container has attached a water inlet tube connected to a water source and a water outlet tube connected to a water reservoir, b) a first electrode made of a conductive mineral and located within said container, wherein said first electrode is comprised of a circular cylinder dimensioned to allow a second electrode made of a conductive material to be coaxially located within said cylindrical first electrode, wherein said second electrode consists of a set of protrusion dispersed along the length of said second electrode, where said protrusions attract gaseous bubbles which form on the surface of said second electrode, to aid in releasing the gaseous bubbles, and c) means for applying a positive d-c current to said first electrode and a negative d-c current to said second electrode, wherein the applied current causes said first electrode to ionize and release particles of ionized minerals into the water to produce mineral water.

2. A mineral ionizing device consisting essentially of:

a) a container designed to contain a specific quantity of water or to allow the passage of a continuous flow of water, wherein said container has attached a water inlet tube connected to a water source and a water outlet tube connected to a water reservoir, b) a solid-mineral first electrode located within said container, wherein said first electrode is comprised of a cylinder dimensioned to allow a second electrode to be coaxially located within said cylindrical first electrode, c) means for applying a positive d-c current to said first electrode and a negative d-c current to said second electrode, wherein the applied current causes said first electrode to ionize and release particles of ionized minerals into the water to produce mineral water, and d) means for producing a vibration within said container, wherein said vibrations aid in releasing the gaseous bubbles which form on the surface of said second electrode.

3. A mineral ionizing device consisting essentially of:

a) a container designed to contain a specific quantity of water or to allow the passage of a continuous flow of water, wherein said container has attached a water inlet tube connected to a water source and a water outlet tube connected to a water reservoir, b) a solid-mineral first electrode located within said container, wherein said first electrode is comprised of a cylinder dimensioned to allow a second electrode to be coaxially located within said cylindrical first electrode, c) means for applying a positive d-c current to said first electrode and a negative d-c current to said second electrode, wherein the applied current causes said first electrode to ionize and release particles of ionized minerals into the water to produce mineral water, wherein said means for applying the d-c current also includes a means for periodically reversing the polarity of the d-c current applied to said first and second electrodes, wherein the current reversals in releasing the gaseous bubbles which form on the surface of said second electrode, d) an H-bridge circuit designed to allow current, in a first time period, to flow in a forward direction, and in a second time period, to flow in a reverse direction, wherein the output of said H-bridge circuit is connected across said first and second electrodes, e) an input/delay circuit connected to the input of said H-bridge circuit via an overload shutoff circuit, wherein said input/delay circuit sets the timing for the forward current and the reverse current, f) an overload sensing circuit connected between said H-bridge circuit and said overload shutoff circuit, wherein when the current through said H-bridge circuit exceeds a threshold level, the excess current is sensed by said sensing circuit which causes said overload shutoff circuit to disable said H-bridge circuit and subsequently said unit, and g) a regulated d-c power supply designed to power the circuits of said unit.

4. A mineral ionizing device comprising:

a) an enclosure which includes a first horizontal surface and a second horizontal surface, with said first horizontal surface having a seal bore, b) a resilient seal having a perimeter, a central bore and dimensioned to be securely inserted into the seal bore, c) a vibratory spring having an inverted U-shape with a central horizontal section having a centered bore, and a first end and a second end that are attached, by an attachment means, to the interior of the second horizontal surface of said enclosure, d) a solid-mineral, cylindrical first electrode having an upper end and a lower end, wherein the lower end is securely held around the perimeter of said resilient seal, e) a second electrode coaxially located within said first electrode and having an upper end that is adjacent the upper end of said first electrode, and a threaded lower end that is inserted through the central bore on said resilient seal and attached by a bolt inserted through the centered bore on said vibratory spring and into the threaded lower end of said second electrode, f) an elongated container having an open upper end and a lower end dimensioned to enclose the first and second electrodes and to be releasably attached, by an attachment means, to the first horizontal surface of said enclosure, and g) a set of individual protrusions or a single spiraled protrusion located on said second electrode, wherein said protrusions attract gaseous bubbles which form on the surface of said second electrode and aid in releasing the gaseous bubbles, h) a vibration unit connected to said second electrode and operated by a power source, wherein the vibrations produced by said vibration unit aids in releasing the gaseous bubbles which form on the surface of said second electrode, and i) a periodic current-reversing unit located within said enclosure and designed to produce a polarity-reversing d-c current output, wherein the positive d-c current output is connected to said first electrode via an electrical lead, and the negative side is connected to said second electrode via the vibratory spring, wherein the current reversal aids in releasing the gaseous bubbles which form on the surface of said second electrode, wherein when water is inserted into said elongated container and the d-c current is applied, said first electrode ionizes and releases particles of ionized mineral into the water which results in the production of mineral water.

5. The device as specified in claim 4 wherein said container further comprises a water inlet tube connected to a water source, and a water outlet tube connected to a mineral water reservoir, wherein said tubes allow a continuous flow of water to pass through said container to allow the production of a continuous flow of mineral water.

* * * * *